July 21, 1970   J. E. O'NEAL   3,521,365
DUCT MEASURING INSTRUMENT
Filed Aug. 13, 1968   2 Sheets-Sheet 1
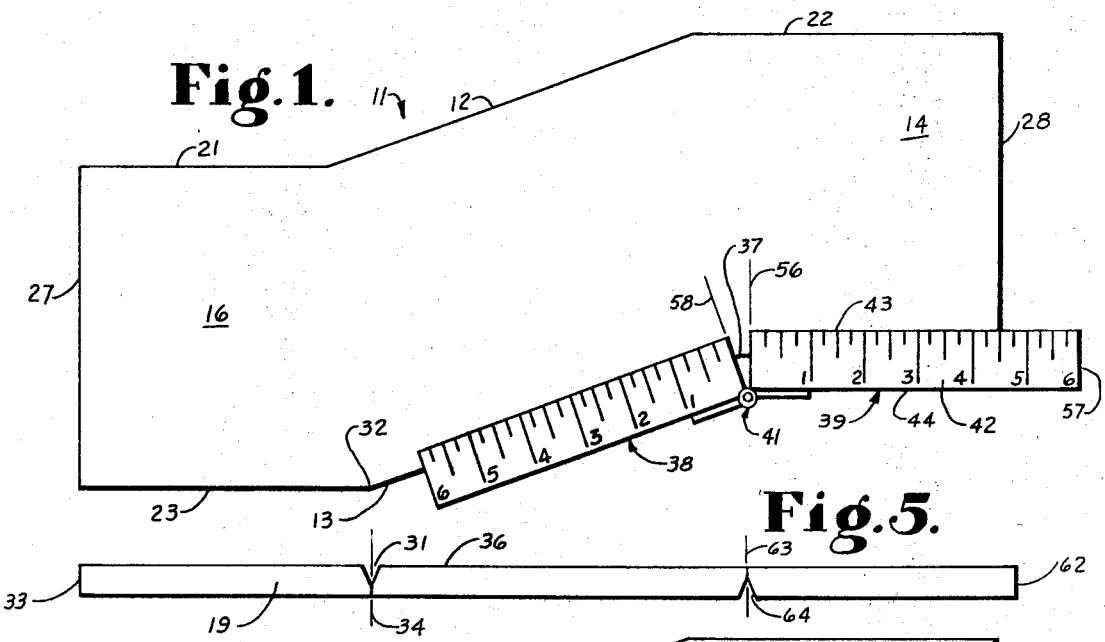
Fig. 1.
Fig. 5.
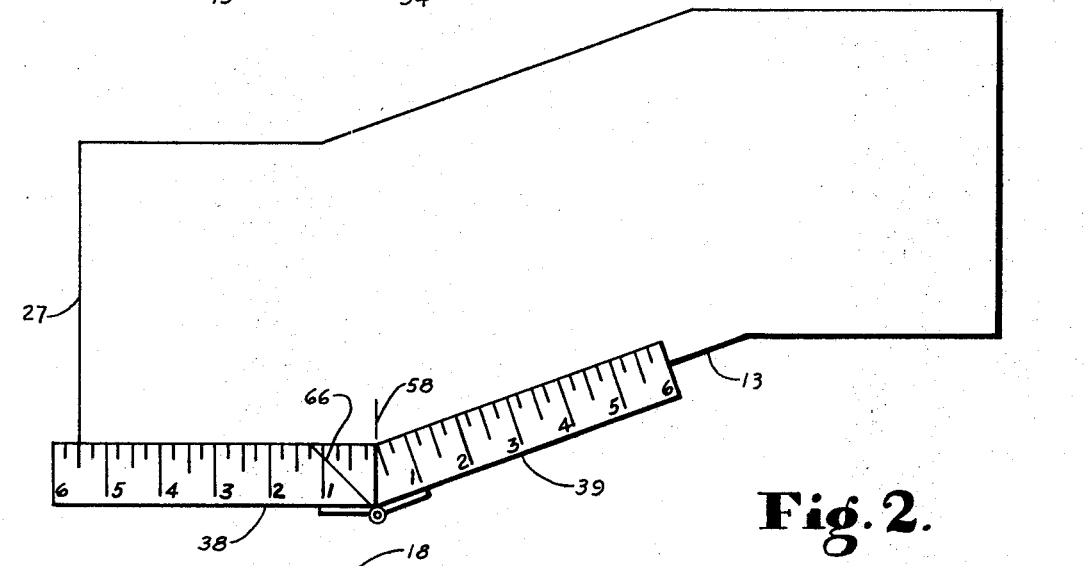
Fig. 2.
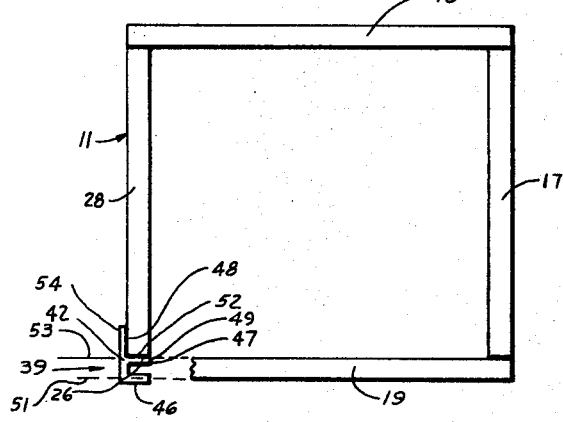
Fig. 3.
INVENTOR
John E. O'Neal
BY
Woodard, Weikart, Emhardt & Naughton
Attorneys US 3,521,365
Patented July 21, 1970

3,521,365
DUCT MEASURING INSTRUMENT
John E. O'Neal, Indianapolis, Ind., assignor of sixty percent to John J. Cotton, Indianapolis, Ind.
Filed Aug. 13, 1968, Ser. No. 752,292
Int. Cl. G01b 3/06
U.S. Cl. 33—105                                    7 Claims

ABSTRACT OF THE DISCLOSURE

A measuring instrument having a pair of elongated straight edged plates hinged together, each plate having a pair of longitudinally extending parallel flanges, one flange being along one edge of each plate and the second flange on each plate being spaced from the hinge axis a distance equal to the thickness of duct material with which the instrument is to be used, the plates having graduations thereon extending in increasing designations from the hinge axis.

BACKGROUND OF THE INVENTION

Field of the invention

This invention relates generally to measuring instruments, and more particularly an instrument for automatically compensating for thickness of a material on which linear measurements are to be made.

Description of the prior art

A variety of measuring instruments, including those of a graduated rule type, is well known in the art. Examples are shown in patents as follows: 803,292, Keefer, Oct. 31, 1905; 1,468,598, Libby, Sept. 18, 1923; 1,652,980, Glass, Dec. 13, 1927; 3,321,835, Curtis, May 30, 1967. None of these patents is satisfactory for the intended purpose of the present invention which is, broadly speaking, to make it easy to measure and mark lengths of materials of considerable thickness for mounting against surfaces or edges having offsets along their length. The nature of the problem and its solution according to the present invention will be better understood after a reading of the detailed description which follows herein.

SUMMARY OF THE INVENTION

Described briefly, in a typical embodiment of the measuring instrument itself according to the present invention, first and second elongated members are pivotally connected together and have graduations thereon based upon the pivot axis as a reference. Locators are provided on the members and spaced from the axis a distance corresponding to the thickness of the material with which the instrument is to be used to facilitate the direct attainment of meaningful measurements.

BRIEF DESCRIPTION OF THE DRAWINGS

The full nature of the invention will be understood from the accompanying drawings and the following description and claims.

FIG. 1 is a side elevational view of a length of duct wall having a measuring instrument mounted thereon according to one embodiment of the invention, to make a measurement for marking a bottom wall.

FIG. 2 is an elevational view like FIG. 1 but showing the use of the instrument at a ridge on the duct wall member, rather than at a valley as in FIG. 1.

FIG. 3 is an end view of a complete duct, with a portion of the lower wall broken away to show the measuring instrument mounted at one edge of a side wall, this view being for explanatory and illustrative purposes in connection with the description.

FIG. 5 is an elevational view of a bottom wall or floor with notches provided therein at locations determined by the means and method of the present invention, but before the bending at the fold notches is done.

DESCRIPTION OF THE PREFERRED EMBODIMENT

Figure 4:
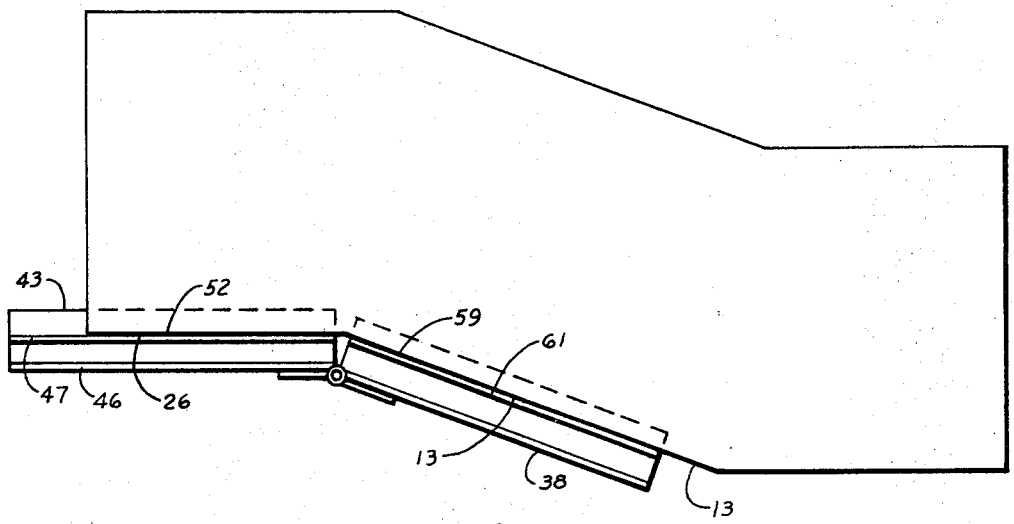
FIG. 4 is an elevational view of the arrangement of FIG. 1, but looking at it from the opposite side.

Referring now to FIGS. 1 and 3 of the drawings, a length 11 of a material to be used in construction of a portion of an air duct, is shown as having inclined edges 12 and 13 providing an offset between the portions 14 and 16. An example of such material is compressed glass wool board such as manufactured by the Owens Corning Fiberglas Corporation of Toledo, Ohio and sometimes referred to as "Industrial Duct System." Such material is typically one inch thick and it is rigid, but it can be cut by a saw or a knife.

To construct a duct of such material it is common to provide two upstanding walls and two horizontal walls and in FIG. 3 these would be the upstanding walls 11 and 17, and the upper and lower walls 18 and 19. Once boards have been cut to provide upstanding walls 11 and 17 having the shape shown in FIG. 1 to provide the needed offset in this portion of duct, the problem is to measure and cut the boards 18 and 19 so that they properly fit on the side walls. The difficulty in making such measurements arises from the fact that the material is of substantial thickness and unless it is measured and cut with this thickness in mind and compensated for, the cut pieces will not properly fit smoothly against the edges 21, 12 and 22 for the top board and 23, 13 and 26 for the bottom board, and at the same time be flush with the end edges 27 and 28.

It is believed that a brief example may help demonstrate the problem. To measure a bottom board 19 and provide a groove 31 at the proper location for a fold at the point 32 between edges 23 and 13 of the side wall, a person might measure from the edge 27 to the ridge 32, making the measurement along the edge 23. If this same measurement is used from the edge 33 of the board 19 to the center line 34 of the fold groove 31, when the board 19 is mounted to the board 16, one of two situations will exist: either the edge 33 will not line up with edge 27 if the board face 36 is placed flat along the edge 13, or; if edge 33 is lined up with edge 27, some of the board material must be crushed adjacent the point 32 or the surface 36 cannot be placed flat and straight along the edge 13.

The same type of problem as described above with reference to the ridge 32, is encountered in providing a slot or notch to fold the bottom board as needed to accommodate the valley or notch at 37 in the lower edge of the wall 11. According to the present invention, however, the measuring instrument provided is effective to automatically compensate for the thickness of the board so that the fold lines are located exactly as required to provide a perfect fit in the assembly.

According to the illustrated embodiment of the instrument of the invention, two elongated members 38 and 39 are pivotally connected together by the hinge assembly 41. Referring particularly to member 39, it includes the elongated plate 42 having the straight upper marginal edge 43, the straight lower marginal edge 44, a lower marginal edge flange 46, and an intermediate flange 47. Therefore, as easily observable in FIG. 3, an F shaped cross section is typical for this member with the plate 42 providing the staff, and flanges 46 and 47 providing the end arm and intermediate arm, respectively of the F. The width of the flanges is such that from the inner face 48 of the plate to the inner edge 49 of the flanges, the distance is about equal to the thickness of the wall board 11. This facilitates the placing of the instrument on a table along with a piece of the board for making a measurement with the face 48 in contact with the board.

The hinge 41 should be located so that the hinge axis 51 is coplanar with the plane located a distance from the plane of the locator surface 52 of flange 47, which is equal to the thickness of the board to be measured. In other words, the distance between plane 53 of the locator face 52 and a plane parallel thereto and containing the hinge axis 51 should equal the thickness of the board 19. The height of the plate surface 48 above the locator surface 52 of the intermediate flange 47 is not critical, so long as it is enough to facilitate the locating of the instrument on the board to be measured.

Graduations are provided on the outside face 54 of the plate 42. These graduations begin with a line 56 (FIG. 1) intersecting the hinge axis and perpendicular to the plane of the locator surface 52 of the locator flange 47. The graduations increase from that point to the free end 57 of the member and, in the illustrated embodiment, every inch is numbered and sub-divided into quarters. Further sub-divisions can be provided if desired.

The member 38 is much like member 39, except for the fact that the graduations on it increase to the left rather than to the right. Like member 39 the graduations on 38 begin with a reference line 58 colinear with the edge of the member and intersecting the axis 51 of the hinge 41. Although both members are shown to be six inches long, they can be any length desired. Furthermore they can be graduated in units of measurement other than inches and divisions thereof. It has been found preferable to provide the graduations at the edge remote from the plane of the hinge axis, as shown.

In the use of the measuring instrument according to the present invention, a length of bottom board 19 may be cut so its overall length is equal to the distance from the edge 27 to the edge 28 of the wall board 11 measured along the lower edge 23, edge 13, and edge 26. For the location of the fold from the right-hand edge thereof, the instrument is placed in position as shown in FIGS. 1 and 4 so that the upper locating surfaces of the intermediate locating flanges of both members are flat against the edges 26 and 13. In other words, the upper face 52 of the flange 47 is placed flat against the lower edge 26. The upper face 59 of the intermediate flange 61 of the member 38 is placed flat against the edge 13. Once this has been accomplished, the scale reading on the member 39 is made at the edge 28. This happens to be four and one-half inches in the illustrated example. Then the measuring instrument is placed on the bottom board and the four and one-half inch mark on the rule is placed co-incident with the edge 62 of the board. The location of the reference line of the instrument on the board is noted at 63, for example and a notch or slot or groove 64 is cut therein, centered on this line.

To provide the location for the groove 31, the instrument is placed on the board in the same manner, but in this instance the flat surfaces 52 and 59 are placed flat against the edges 13 and 23, respectively, of the board and a reading is made on the scale on the portion 38. This happens to be five and one-half inches in the illustrated example, at the edge 27. Then the instrument is placed on the board 19 with the five and one-half inch mark aligned with the edge 33 thereof and a mark is made at a line coincident with the reference line 58 on the scale. This is the center line 34 of the notch 31, which can then be cut in the board. Then, when the board is placed on the bottom of the walls 11 and 17, it fits perfectly. The edges 33 and 62 are flush with the wall edges 27 and 28 and the upper board faces are flat against the lower edges of the walls.

It will be noted in FIG. 2 that a portion of the member 39 immediately adjacent the hinge and the one-half inch mark is hidden behind the corresponding portion of the rule member 38. This is facilitated by providing an offset along the line 66 in the portion of the rule 38 between that line and the edge 58. Accordingly the scale bearing staff portions of the two rule members are coplanar throughout their entirety at all times, except for the small triangular portion just described here immediately adjacent the offset line 66.

The instrument can be employed for the top board in the same manner as described here with reference to the lower board. It is also quite useful for offsets of other characteristics and amounts.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:
1. A measuring instrument comprising:
first and second elongated members pivotally connected together, said first member having graduations thereon;
a locator flange on each of said members, said locator flanges having axis locator faces thereof spaced from the axis of pivotal connection of said members and disposed in planes parallel to said axis;
said members having member positioning planar surfaces thereon lying in a plane normal to said axis and projecting away from said flanges on the opposite side of said flanges from said axis, said locating faces being perpendicular to said normal plane.

2. A measuring instrument comprising:
first and second elongated members pivotally connected together, said first member having graduations thereon;
a locator flange on each of said members, said locator flanges having axis locator faces thereof spaced from the axis of pivotal connection of said members and disposed in planes parallel to said axis;
each of said members has a planar surface lying in a plane normal to said axis and each of said members has a channel therein, the said locator flange of a member providing one wall of the channel, another wall of said channel being coplanar with said axis and parallel with said one wall, and one third wall of said channel having a surface coplanar with said planar surface of said member.

3. A measuring instrument comprising:
first and second elongated members pivotally connected together, said first member having graduations thereon;
a locator flange on each of said members, said locator flanges having axis locator faces thereof spaced from the axis of pivotal connection of said members and disposed in planes parallel to said axis;
each of said members is F shaped in cross section, having a staff portion, an end arm portion, an an intermediate arm portion providing said locator flange, the pivotal connection being provided by a hinge located at the ends of the end arm portions of said members and having a hinge axis coplanar with said end arm portions.

4. A measuring instrument comprising:
first and second elongated members pivotally connected together, said first member having graduations thereon;
a locator flange on each of said members, said locator flanges having axis locator faces thereof spaced from the axis of pivotal connection of said members and disposed in planes parallel to said axis;
each of said members includes an elongated plate with first and second flanges thereon, said first flange being at one margin of said plate and extending therealong, said second flange being said locator flange and disposed intermediate said one flange and another margin of said plate parallel to said one margin, and said second flange extending parallel to said first flange, the space between the plane containing said pivotal axis and the locating face on said second flange being substantially equal to the width of said flanges.

5. The instrument of claim 4 wherein:
the plate of said one member is offset adjacent said pivot axis to facilitate an overlapping relationship between the plates adjacent said axis and maintain a coplanar relationship of the ramining portions of said plates.

6. A method of locating a fold line on a first board, for matching two diverging edges of a second board, and comprising the steps of:
placing a pair of locating faces against said edges;
pivoting said faces about an axis spaced from planes of said locating faces a distance substantially equal to the thickness of said first board;
continuing said pivoting until said faces are flat against said edges and a scale graduation related to one of said faces is aligned with a reference on said second board perpendicular to one of said edges;
placing said scale graduation on a reference on said first board, and;
marking said first board for a fold line at the location of said axis.

7. The method of claim 6 wherein said references on said first and second boards are end margins thereof.

References Cited
UNITED STATES PATENTS

| 749,921 | 1/1904 | Davidson | 33—118 X |
| 1,652,980 | 12/1927 | Glass | 33—115 |
| 2,973,584 | 3/1961 | Snapp | 33—75 X |

HARRY N. HARDIAN, Primary Examiner

U.S. Cl. X.R.

33—90